(12) United States Patent
Yao et al.

(10) Patent No.: US 11,773,302 B2
(45) Date of Patent: Oct. 3, 2023

(54) SOFT SOLVENT-FREE FLAME-RETARDANT POLYURETHANE SYNTHETIC LEATHER AND PREPARATION METHOD THEREFOR

(71) Applicant: ANHUI ANLI MATERIAL TECHNOLOGY CO., LTD., Anhui (CN)

(72) Inventors: Heping Yao, Anhui (CN); Yuanzhou Song, Anhui (CN); Yanwu Wang, Anhui (CN); Wanli Huang, Anhui (CN); Yifeng Wang, Anhui (CN); Kejian Yao, Anhui (CN); Ruilin Wang, Anhui (CN); Sen Wang, Anhui (CN); Yundong Luo, Anhui (CN); Yongzhi Chen, Anhui (CN)

(73) Assignee: ANHUI ANLI MATERIAL TECHNOLOGY CO., LTD., Anhui (CN)

( * ) Notice: Subject to any disclaimer, the term of this patent is extended or adjusted under 35 U.S.C. 154(b) by 360 days.

(21) Appl. No.: 17/311,695

(22) PCT Filed: Dec. 19, 2018

(86) PCT No.: PCT/CN2018/122060
§ 371 (c)(1),
(2) Date: Jun. 8, 2021

(87) PCT Pub. No.: WO2020/118746
PCT Pub. Date: Jun. 18, 2020

(65) Prior Publication Data
US 2022/0033694 A1 Feb. 3, 2022

(30) Foreign Application Priority Data
Dec. 13, 2018 (CN) .......................... 201811528216.X

(51) Int. Cl.
| | | |
|---|---|---|
| *C09J 7/29* | (2018.01) | |
| *C09J 175/04* | (2006.01) | |
| *C09J 7/21* | (2018.01) | |
| *C08G 18/32* | (2006.01) | |
| *C08K 3/22* | (2006.01) | |
| *C08K 3/28* | (2006.01) | |

(Continued)

(52) U.S. Cl.
CPC ........ *C09J 175/04* (2013.01); *C08G 18/3203* (2013.01); *C08K 3/22* (2013.01); *C08K 3/28* (2013.01); *C08L 75/12* (2013.01); *C08L 75/14* (2013.01); *C09D 175/12* (2013.01); *C09D 175/14* (2013.01); *C09J 7/21* (2018.01); *C09J 7/29* (2018.01); *D06N 3/0059* (2013.01); *D06N 3/0061* (2013.01); *D06N 3/0097* (2013.01); *D06N 3/147* (2013.01); *C08K 2003/2227* (2013.01); *C08K 2003/2296* (2013.01); *C08L 2201/02* (2013.01); *C08L 2205/035* (2013.01); *D06N 2209/067* (2013.01); *D06N 2209/146* (2013.01); *D06N 2209/1642* (2013.01); *D06N 2211/28* (2013.01)

(58) Field of Classification Search
CPC ......... B23P 19/02; B23P 19/04; B25B 27/24; B62D 5/083; Y10T 29/49412; Y10T 29/5383; Y10T 29/53913; A61P 25/00; A61P 35/00; C07D 413/06; C07D 417/06; C07D 419/06; C07D 493/04; C08G 18/3203; C08G 18/44; C08G 18/48; C08G 18/797; C08K 2003/2227; C08K 2003/2296; C08K 3/22; C08K 3/28; C08K 2003/026; C08K 2003/323; C08K 2003/385; C08K 3/20; C08K 3/38; C08L 2201/02; C08L 2205/035; C08L 75/12; C08L 75/14; C09D 175/12; C09D 175/14; C09D 175/04; C09D 5/16; C09J 175/04; C09J 7/21; C09J 7/29; D06N 2209/067; D06N 2209/0823; D06N 2209/103; D06N 2209/105; D06N 2209/146; D06N 2209/1642; D06N 2209/1685; D06N 2211/28; D06N 3/0059; D06N 3/0061; D06N 3/0063; D06N 3/0097; D06N 3/145; D06N 3/146; D06N 3/147; D06N 2209/1671; D06N 3/0065; D06N 3/14
See application file for complete search history.

(56) References Cited

U.S. PATENT DOCUMENTS

2005/0100710 A1   5/2005   Feng et al.

FOREIGN PATENT DOCUMENTS

| CN | 106381721 | 2/2017 |
| CN | 107190520 | 9/2017 |

(Continued)

OTHER PUBLICATIONS

"International Search Report (Form PCT/ISA/210) of PCT/CN2018/122060", dated Aug. 27, 2019, with English translation thereof, pp. 1-6.

*Primary Examiner* — Lawrence D Ferguson
(74) *Attorney, Agent, or Firm* — JCIP GLOBAL INC.

(57) ABSTRACT

Disclosed are a soft solvent-free flame-retardant polyurethane synthetic leather and a preparation method therefor. The soft solvent-free flame-retardant polyurethane synthetic leather comprises an antifouling layer, a surface layer, an intermediate layer, a bonding layer and a base cloth in sequence from top to bottom, wherein the bonding layer is prepared from component A and an isocyanate; the molar ratio of —NCO in the isocyanate to —OH in the component A is 0.85-0.93; and the component A is composed of a polyhydric alcohol, an inhibition-type catalyst, a flame retardant, a filler and a viscosity modifier in parts by weight.

17 Claims, No Drawings

(51) Int. Cl.
*C08L 75/12* (2006.01)
*C08L 75/14* (2006.01)
*C09D 175/12* (2006.01)
*C09D 175/14* (2006.01)
*D06N 3/00* (2006.01)
*D06N 3/14* (2006.01)

(56) References Cited

FOREIGN PATENT DOCUMENTS

| | | |
|---|---|---|
| CN | 107268281 | 10/2017 |
| CN | 107385940 | 11/2017 |
| CN | 107385944 | 11/2017 |
| CN | 107503168 | 12/2017 |
| CN | 107974139 | 5/2018 |

SOFT SOLVENT-FREE FLAME-RETARDANT POLYURETHANE SYNTHETIC LEATHER AND PREPARATION METHOD THEREFOR

CROSS-REFERENCE TO RELATED APPLICATION

This application is a 371 of international application of PCT application serial no. PCT/CN2018/122060, filed on Dec. 19, 2018, which claims the priority benefit of China application no. 201811528216.X, filed on Dec. 13, 2018. The entirety of each of the above mentioned patent applications is hereby incorporated by reference herein and made a part of this specification.

BACKGROUND

Technical Field

The invention relates to a polyurethane synthetic leather, and in particular, relates to a soft solvent-free flame-retardant polyurethane synthetic leather and a preparation method therefor.

Description of Related Art

Nowadays, with rising environmental protection needs, research on environmental-friendly polyurethane synthetic leather becomes popular. In recent years, research on the solvent-free polyurethane synthetic leather has attracted much attention due to its properties such as environmental friendliness, excellent performance, etc. Besides, compared with the water-based polyurethane synthetic leather, the solvent-free polyurethane synthetic leather features certain advantages in terms of energy consumption and performance.

The solvent-free polyurethane material is an organic polymer material, but polyurethane without being subjected to a flame-retardant treatment is not flame-resistant, may burn and decompose in fire, may produce a large amount of toxic smoke and gas, and thus may endanger personal and property safety. At present, the solvent-based or solvent-free flame-retardant polyurethane synthetic leather available on the market generally shows defects such as hard hand feel, strong plastic feel, unfavorable performance, poor flame retardant effect, etc., failing to satisfy consumers' needs as a result. Under this situation, research and development of polyurethane synthetic leather with good durability, soft hand feel, strong skin-friendliness, excellent flame-retardant performance, and environmental friendliness to meet the market's needs for the functionality and diversity of synthetic leather products is an important issue.

SUMMARY

Technical Problems

A solvent-free polyurethane material is an organic polymer material, but polyurethane without being subjected to a flame-retardant treatment is not flame-resistant, may burn and decompose in fire, may produce a large amount of toxic smoke and gas, and thus may endanger personal and property safety. At present, the solvent-based or solvent-free flame-retardant polyurethane synthetic leather available on the market generally shows defects such as hard hand feel, strong plastic feel, unfavorable performance, poor flame retardant effect, etc., failing to satisfy consumers' needs as a result.

Solutions to Problems

Technical Solutions

The invention aims to provide a soft solvent-free flame-retardant polyurethane synthetic leather and a preparation method therefor, and the polyurethane synthetic leather prepared by the invention has daily life antifouling properties, a good durability, is soft to touch, is strongly skin-friendly, and has a very superior flame-retardant performance; the production process is simple, efficient and environmentally friendly and same can satisfy market demands.

To overcome the problems in the related art and to accomplish the foregoing purpose, the following technical solutions are adopted by the invention.

The invention provides a soft solvent-free flame-retardant polyurethane synthetic leather including an antifouling layer, a surface layer, an intermediate layer, a bonding layer, and a base cloth in sequence from top to bottom. The bonding layer is prepared from a component A and an isocyanate, and a molar ratio of —NCO in the isocyanate to —OH in the component A is 0.85-0.93.

The component A is composed of following raw materials in parts by weight:

| | |
|---|---|
| a polyhydric alcohol | 105-115 parts, |
| an inhibition-type catalyst | 0.03-0.08 parts, |
| a flame retardant | 2-10 parts, |
| a filler | 5-25 parts, and |
| a viscosity modifier | 3-6 parts. |

Further, the inhibition-type catalyst is an environmentally friendly organic zirconium catalyst, and the flame retardant is at least two of GRPHOS 8815-10 and GRPHOS 8815-57 of Gulec and EXOLIT AP 462 and EXOLIT RP-652 of Clariant.

The filler refers to a modified filler obtained by dry modification of a mixture of aluminum hydroxide, boron nitride, and zinc oxide, and a mass ratio of the aluminum hydroxide, boron nitride, and zinc oxide is (40-60):(10-20):(20-40).

The viscosity modifier is glycerol triacetate.

Further, a preparation method for the modified filler includes the following steps.

1) 10-15 g silane coupling agent, 3.5-5 g water, and 50-80 g absolute ethanol were added into a container, and the container was sealed and placed in a constant temperature water bath at 25-35° C. for hydrolysis for 10-30 min to obtain a hydrolysate.
2) The aluminum hydroxide, boron nitride, and zinc oxide were mixed into a mixture at a mass ratio of (40-60):(10-20):(20-40), and 1-2 kg of the mixture was added to a high-speed mixing mixer. A speed of the high-speed mixing mixer was 500-800 r/min, and a drying temperature was set to 110-125° C.
3) The hydrolysate prepared in step (1) was added into the high-speed mixing mixer provided in step (2) in three batches, and an interval of adding each batch was 5-8 min. An amount of a first batch added was 30-50% of a mass of the hydrolysate, an amount of a second batch added was 20-40% of the mass of the hydrolysate, and a third batch was a remaining amount.

4) After the addition was completed, stirring was performed at a high speed for 10-20 min under a condition of 1,200-2,000 r/min, and discharging and cooling were performed to obtain the modified filler.

Further, the antifouling layer is prepared by following components in parts by weight:

| | |
|---|---|
| a water-based antifouling surface agent | 100 parts, and |
| a hydrolysis resistance additive | 0.5-2 parts, |
| The surface layer is prepared by following components in parts by weight: | |
| a polyether polycarbonate polyurethane resin | 90-160 parts, |
| an environmentally friendly solvent | 55-85 parts, |
| an abrasion-resistant additive | 0.4-1.0 parts, |
| a liquid flame retardant | 1-2 parts, |
| a wetting agent | 0.1-0.4 parts, |
| a stabilizer | 0.3-1.2 parts, and |
| a pigment paste | 3-15 parts. |

Preferably, the water-based antifouling surface agent is an aliphatic water-based polyurethane, and the hydrolysis resistance additive is a modified polycarbodiimide.

The polycarbonate polyurethane resin is formed by mixing NE-8875-30MF and ST-8630 at a weight ratio of 1.5:(1-1.5), and the liquid flame retardant is a halogen-free phosphate flame retardant.

The water-based gloss anti-graffiti treatment agent SF-6110 produced by Jiande Shunfa Chemical Auxiliary Co., Ltd. is selected for the aliphatic water-based polyurethane with a solid content of 25±2% and a viscosity of 1,500-3,000 C PS/25° C.

XR-5580 provided by Stahl is selected for modified polycarbodiimide, which is mainly used as a general crosslinking agent for water-based acrylic, a polyurethane system, or a solvent-based product thereof and may significantly improve water resistance, chemical resistance, and abrasion resistance, and at the same time, may enhance adhesion to a substrate.

FRA-9555 provided by Stahl is selected for halogen-free phosphate flame retardant, which exhibits good hydrolytic stability, low volatility, and low fogging properties.

NE-8875-30MF is a product of Dainichi Seika (Shanghai) Chemical Co., Ltd., and

ResamineNE-8875-30MF is a two-component carbonate/ether type developed as a material for artificial leather, which is a polyurethane resin solution with favorable performance. When in use, ResamineNE-8875-30MF is used to bridge the liquid bridging agent to form a flexible elastomer film.

ST-8630 is a product of Hefei Amway Polyurethane New Material Co., Ltd. ST-8630 is an aromatic surface layer polyurethane resin, and such resin leather has the properties such as soft and puffy hand feel, providing wet wax on the surface, and excellent hydrolysis resistance. The performance thereof is: solid content 28±1%, solvent is DMF/DMC, 100% constant elongation modulus 2.7±0.5 MPa, elongation at break ≥400%, and tensile strength ≥30.0 MPa.

Further, the intermediate layer is prepared by following components in parts by weight:

| | |
|---|---|
| a polyether polycarbonate polyurethane resin | 90-160 parts; |
| an environmentally friendly solvent | 50-70 parts; |
| an abrasion-resistant additive | 0.5-2 parts; |
| a soluble flame retardant | 1-6 parts; |
| a wetting agent | 0.1-0.4 parts; |
| a stabilizer | 0.5-1.5 parts; and |
| a pigment paste | 3-15 parts |

Preferably, the polyether polycarbonate polyurethane resin is NES-9015-22, and the soluble flame retardant is a phosphazene flame retardant.

The polyether polycarbonate polyurethane resin NES-9015-22 is a product of Dainichi Seika (Shanghai) Chemical Co., Ltd. SPB-100 produced by Adeka Japan is selected for phosphazene flame retardant. The phosphazene flame retardant contains neither halogen nor antimony and has a high phosphorus content (13.4%), other phosphate content is 9-11%, a nitrogen content is 6%, and the phosphazene flame retardant has excellent hydrophobicity, water resistance, and high temperature resistance.

Further, the base cloth is a Peite flame-retardant recycled leather base cloth and is formed by leather powder and cotton woven cloth in a weight ratio of (55-65):(35-45). A thickness thereof is 1.3±0.1 mm, and a weight thereof is 700±20 g/cm$^2$.

The invention further provides a preparation method for the soft solvent-free flame-retardant polyurethane synthetic leather, and the preparation method includes the following steps.

(1) A surface layer slurry was evenly stirred and mixed, evacuating was performed, the surface layer slurry was evenly coated and scrapped on a front surface of a piece of release paper to act as the surface layer, an intermediate layer slurry was evenly stirred and mixed, evacuating was performed, and the intermediate layer slurry was evenly coated and scrapped on the surface layer to prepare the intermediate layer.

(2) The component A and the isocyanate were stirred and mixed to form a bonding layer slurry, the bonding layer slurry was coated on the intermediate layer, and heating and drying were performed to obtain the bonding layer.

(3) The base cloth was laminated on the bonding layer, and drying, curing, peeling off, and dividing into rolls were performed to obtain a polyurethane synthetic leather semi-finished product.

(4) An antifouling layer slurry was roll-coated on a leather surface of the synthetic leather semi-finished product prepared in step (3) through a surface roller, and drying was performed to obtain the synthetic leather semi-finished product.

Further, a coating thickness of the surface layer slurry is 0.05-0.08 mm, a coating and scraping thickness of the intermediate layer slurry is 0.12-0.18 mm, and the surface layer and the intermediate layer are air-dried for 1-1.5 min at 110-115° C. in step (1).

A mixing and stirring speed of the bonding layer slurry is 3,000-3,500 r/min, a heating and drying temperature is 80-95° C., and a coating thickness of the bonding layer is 0.25-0.4 mm in step (2), A drying temperature is 110-130° C., curing time is 5-7 min, and a lamination gap when laminating the base cloth is 78-85% of a thickness of the base cloth in step (3).

A drying temperature is 140-150° C., the surface roller is 300 mesh, and a speed is 20-25 m/min in step (4).

The environmentally friendly solvent, the abrasion-resistant additive, the soluble flame retardant, the wetting agent, the stabilizer, and the pigment paste, etc. provided by the invention are all commonly used auxiliary additives in this field and are not particularly limited by the invention.

Beneficial Effects of Invention

Beneficial Effects

Compared to the related art, advantages of the invention include the following.
1. An environmentally friendly organic zirconium catalyst is adopted by the invention, such that the bonding layer slurry obtained by mixing the component A and the isocyanate is coated on the intermediate layer and has low reaction activity and good knife passability at room temperature (25° C.). When the temperature is greater than 80° C., the reaction activity is significantly improved, the reaction time is shortened, and the production efficiency is improved.
2. NE-8875-30MF and ST-8630 are adopted to act as the surface layer resin and NES-9015-22 is adopted to act as the intermediate layer resin in the invention, and these resins have low modulus and good abrasion resistance. In addition, the R value in the solvent-free bonding layer material is small, which is 0.85-0.93, such that the prepared synthetic leather is soft to touch, is strongly skin-friendly, and has excellent abrasion resistance and good durability.
3. A compound flame retardant is added to the bonding layer in the invention, and the synergistic effect is used to improve the flame retardant effect. Further, the use of the Peite flame-retardant recycled leather base cloth, which is formed by leather powder and cotton woven cloth in a weight ratio of (55-65):(35-45), can greatly improve the flame retardant performance of synthetic leather. With a low addition amount of the flame retardant, the requirements of American Standard FMVSS 302, British Standard BS5852:2006 and No. 5 flame retardant detection standard may be satisfied.
4. The liquid flame retardant is adopted for the surface layer, and the soluble phosphazene flame retardant (SPB-100), which is soluble in environmentally friendly solvent DEF or DMC, is used in the intermediate layer in the invention, such that the flame-retardant performance of synthetic leather is improved without affecting its physical properties such as flexure resistance and scratch resistance properties.
5. The polyurethane synthetic leather prepared in the invention exhibits good durability, is soft to touch and is strongly skin-friendly, and has a very superior flame-retardant performance (satisfying the British Standard BS5852:2006 and No. 5 flame detection requirements). The production process is simple, efficient, and environmentally friendly and may satisfy market demands.
6. Single-component water-based aliphatic polyurethane is adopted in the invention to act as the antifouling surface agent, and it may be directly roll-coated on the surface of the semi-finished leather through a surface roller after being mixed with the modified polycarbodiimide. The production process is simple, efficient, and environmentally friendly, and in the case of a low coating amount, good antifouling properties can be obtained, and at the same time, has excellent scratch resistance and flexure resistance properties are provided.
7. A dry modification process is adopted in the invention to carry out surface modification treatment on the filler, and when the added amount of silane coupling agent is small (0.5% to 1% of the mass of the filler powder), the activation degree of the modified filler powder can be ≥97%.

DESCRIPTION OF THE EMBODIMENTS

Implementation of Best Practices of Invention

Best Practices of Invention

The sources of the raw materials in the examples are originated as follows.

The mixture A1-2010A is selected for the polyhydric alcohol, the isocyanate is A1-2010B, and both of which are the products of Hefei Amway Polyurethane New Materials Co., Ltd.

The soluble flame retardant is selected from SPB-100 produced by Adeka Japan.

The silane coupling agent is selected from n-propyltrimethoxysilane, which is a product of Jingzhou Jianghan Fine Chemical.

The viscosity modifier is glycerol triacetate, which is specifically a product of EASTMAN (through agent company Shanghai Kaiyin Chemical).

The FRA-9555 and XR-5580 are both products of Stahl.

The SF-6110 is Jiande Shunfa Chemical Auxiliary Co., Ltd.

The absolute ethanol is a product of Sinopharm Chemical Company.

The environmentally friendly solvent is selected from DMC and DEF, both of which are products of Hefei Tongchuang Chemical Co., Ltd.

The wetting agent is selected from LT-7110, which is a product of Hefei Amway Polyurethane New Material Co., Ltd.

The stabilizer is an antioxidant, an ultraviolet absorber or a hindered amine stabilizer. The antioxidant is 1222, 1425, and 1081, which is a product of Ciba SC. The ultraviolet absorber is UV-5411, which is a product of Ciba SC. The hindered amine stabilizer is 2030 and 2040, which is a product of Ciba SC.

The abrasion-resistant additive is PTFE powder or 3238. The abrasion-resistant additive 3238 is a product of Shanghai Hersbit Chemical Co., Ltd., and the abrasion-resistant additive PTFE is a product of product of DuPont of US.

The polycarbonate polyurethane resin in the surface layer is formed by mixing NE-8875-30MF and ST-8630 at a weight ratio of 1.5:(1-1.5). NE-8875-30MF is a product of Dainichi Seika (Shanghai) Chemical Co., Ltd., and ST-8630 is a product of Hefei Amway Polyurethane New Material Co., Ltd.

The polyether polycarbonate polyurethane resin NES-9015-22 is a product of Dainichi Seika (Shanghai) Chemical Co., Ltd.

The inhibition-type catalyst HI-0199 is a product of Dainichi Seika (Shanghai) Chemical Co., Ltd.

A Peite flame-retardant recycled leather base cloth is adopted, which is formed by leather powder and cotton woven cloth in a weight ratio of (55-65):(35-45). A thickness thereof is 1.3±0.1 mm, and a weight thereof is 700±20 g/cm2.

First, 15 g of n-propyltrimethoxysilane, 5 g of water, and 60 g of absolute ethanol were added into a three-neck flask, and the three-neck flask was sealed and placed in a constant temperature water bath at 28° C. for hydrolysis for 15 min. 1.5 kg of the mixture (the mass ratio of aluminum hydroxide, boron nitride, and zinc oxide was 6:2:2) was added into a high-speed mixing mixer, the speed was set to 600 r/min, and the drying temperature was set to 115° C. The n-propyltrimethoxysilane hydrolysate was added to the high-speed mixer in three batches, with an interval of 6 min between each batch. The first batch is 50% of the mass of the hydrolysate, the second batch is 40% of the mass of the hydrolysate, and the third batch is 10% of the mass of the hydrolysate. After the addition was completed, stirring was performed at a high speed for 15 min under a condition of 1,400 r/min, and discharging and cooling were performed to obtain the modified filler.

0.8 parts of the abrasion-resistant additive 3238, 0.3 parts of LT-7110, 0.4 parts of the antioxidant 1222, 0.4 parts of UV-1425, 0.3 parts of the hindered amine stabilizer 2040, 1.5 parts of FRA-9555, 55 parts of ST-8630, and 90 parts of NE-8875-30MF were all dissolved in 85 parts of DMC. 15 parts of pigment paste were added, fully-stirred, and evenly-mixed, evacuating was performed, the slurry was then evenly-coated and scrapped on the front surface of a piece of release paper to act as the surface layer, and the coating and scraping thickness of the surface layer slurry layer was 0.08 mm.

0.5 parts of the abrasion-resistant additive 3238, 1.5 parts PTFE, 0.3 parts of LT-7110, 0.5 parts of the antioxidant 1081, 0.4 parts of UV-5411, 0.5 parts of the hindered amine stabilizer 2030, 6 parts of SPB-100, and 140 parts of NES-9015-22 then were all dissolved in 65 parts of DEF. 13 parts of pigment paste were added, fully-stirred, and evenly-mixed, evacuating was performed, the slurry was then evenly-coated and scrapped on surface layer to prepare the intermediate layer, and the coating and scraping thickness of the intermediate layer slurry layer was 0.18 mm. The surface layer and the intermediate layer were air-dried at 115° C. for 1 min.

Next, 47.5 parts of A1-2010B were added to a storage tank, and 115 parts of A1-2010A, 0.03 parts of HI-0199, 25 parts of modified filler, 10 parts of flame retardant, and 4 parts of glycerol triacetate were added to another storage tank. By adjusting a metering pump, the uniformly stirred materials A and B were delivered to a mixing head according to a set ratio and were quickly mixed and casted on the formed surface layer and the intermediate layer slurry layer with a coating and scraping thickness of 0.4 mm to prepare the bonding layer.

Next, the bonding layer was baked for 1 in at 95° C., and the Peite flame-retardant recycled leather base cloth was laminated, laminated to 1.15 mm, subjected to high-temperature curing, peeled off and divided into rolls after being cured for 7 min at a temperature of 110° C. to prepare a polyurethane synthetic leather semi-finished product.

Finally, on the surface of the polyurethane synthetic leather semi-finished product, under the condition of 120° C. and at a speed of 25 m/min, the antifouling layer slurry which was a mixture of the water-based antifouling surface agent SF-6110 and modified polycarbodiimide XR-5580 was roll-coated by a 300-mesh surface roller. In this way, a soft solvent-free flame-retardant polyurethane synthetic leather exhibiting daily life antifouling properties and good durability, being soft to touch and strongly skin-friendly, and having a very superior flame-retardant performance was prepared.

Embodiments of Invention

The invention is further described in detail in combination with the following specific embodiments. It should be understood that these embodiments described herein serve to describe the invention merely and are not used to limit the protection scope of the invention. In actual applications, the improvements and adjustments made by the technical personnel according to the invention still belong to the protection scope of the invention. The parts in the following examples are all calculated based on parts by mass.

The sources of the raw materials in the following examples are originated as follows.

In the following examples, the mixture A1-2010A is selected for the polyhydric alcohol, the isocyanate is A1-2010B, and both of which are the products of Hefei Amway Polyurethane New Materials Co., Ltd.

The flame retardant GRPHOS 8815-10 and GRPHOS 8815-57 are products of Gulec, and EXOLIT AP-462 and EXOLIT RP-652 are products of Clariant.

The soluble flame retardant is selected from SPB-100 produced by Adeka Japan.

The silane coupling agent is selected from n-propyltrimethoxysilane, which is a product of Jingzhou Jianghan Fine Chemical.

The viscosity modifier is glycerol triacetate, which is specifically a product of EASTMAN (through agent company Shanghai Kaiyin Chemical).

The FRA-9555 and XR-5580 are both products of Stahl.

The SF-6110 is Jiande Shunfa Chemical Auxiliary Co., Ltd.

The BASF material A (CC6945-100C-A), material B (CC6945-100C-B), and 93540/93600 are all products of BASF.

The absolute ethanol is a product of Sinopharm Chemical Company.

The environmentally friendly solvent is selected from DMC and DEF, both of which are products of Hefei Tongchuang Chemical Co., Ltd.

The wetting agent is selected from LT-7110, which is a product of Hefei Amway Polyurethane New Material Co., Ltd.

The stabilizer is an antioxidant, an ultraviolet absorber or a hindered amine stabilizer. The antioxidant is 259, 1222, 1425, or 1081, which is a product of Ciba SC. The ultraviolet absorber is 328, UV-2337, UV-5411, 213, or 171, which is a product of Ciba SC. The hindered amine stabilizer is 783, 791, 2030, or 2040, which is a product of Ciba SC.

The abrasion-resistant additive is PTFE powder or 3238. The abrasion-resistant additive 3238 is a product of Shanghai Hersbit Chemical Co., Ltd., and the abrasion-resistant additive PTFE is a product of product of DuPont of US.

The polycarbonate polyurethane resin in the surface layer is formed by mixing NE-8875-30MF and ST-8630 at a weight ratio of 1.5:(1-1.5). NE-8875-30MF is a product of Dainichi Seika (Shanghai) Chemical Co., Ltd., and ST-8630 is a product of Hefei Amway Polyurethane New Material Co., Ltd.

The polyether polycarbonate polyurethane resin NES-9015-22 is a product of Dainichi Seika (Shanghai) Chemical Co., Ltd.

The inhibition-type catalyst HI-0199 is a product of Dainichi Seika (Shanghai) Chemical Co., Ltd.

A Peite flame-retardant recycled leather base cloth is adopted, which is formed by leather powder and cotton woven cloth in a weight ratio of (55-65):(35-45). A thickness thereof is 1.3±0.1 mm, and a weight thereof is 700±20 g/cm2.

Example 1

First, 10 g of n-propyltrimethoxysilane, 3.8 water, and 60 g of absolute ethanol were added into a three-neck flask, and the three-neck flask was sealed and placed in a constant temperature water bath at 25° C. for hydrolysis for 25 min. 2 kg of the mixture (the mass ratio of aluminum hydroxide, boron nitride, and zinc oxide was 4:2:4) was added into a high-speed mixing mixer, the speed was set to 500 r/min, and the drying temperature was set to 110° C. The n-propyltrimethoxysilane hydrolysate was added to the high-speed mixer in three batches, with an interval of 5 min between each batch. The first batch is 50% of the mass of the hydrolysate, the second batch is 30% of the mass of the hydrolysate, and the third batch is 20% of the mass of the hydrolysate. After the addition was completed, stirring was performed at a high speed for 20 min under a condition of 1,200 r/min, and discharging and cooling were performed to obtain the modified filler.

0.4 parts of the abrasion-resistant additive 3238, 0.2 parts of LT-7110, 0.1 parts of the antioxidant 1425, 0.2 parts of UV-5411, 0.2 parts of the hindered amine stabilizer 2030, 1 part of FRA-9555, 45 parts of ST-8630, and 45 parts of NE-8875-30MF were all dissolved in 60 parts of DMC. 8 parts of pigment paste were added, fully-stirred, and evenly-mixed, evacuating was performed to form a slurry, the slurry was then evenly-coated and scrapped on the front surface of a piece of release paper to act as the surface layer, and a coating and scraping thickness of the surface layer slurry layer was 0.05 mm.

0.5 parts of the abrasion-resistant additive 3238, 0.2 parts of LT-7110, 0.3 parts of the antioxidant 1425, 0.2 parts of UV-5411, 0.2 parts of the hindered amine stabilizer 2030, 1 part of SPB-100, and 90 parts of NES-9015-22 then were all dissolved in 50 parts of DMC. 10 parts of pigment paste were added, fully-stirred, and evenly-mixed, evacuating was performed to form a slurry, the slurry was then evenly-coated and scrapped on surface layer to prepare the intermediate layer, and a coating and scraping thickness of the intermediate layer slurry layer was 0.13 mm. The surface layer and the intermediate layer were air-dried at 110° C. for 1 min.

Next, 43 parts of isocyanate A1-2010B were added to a storage tank, and 105 parts of polyhydric alcohol A1-2010A, 0.015 parts of HI-0199, 8 parts of modified filler, 2 parts of flame retardant GRPHOS 8815-10, 2 parts of EXOLIT AP-462, and 3 parts of glycerol triacetate were then added to another storage tank. By adjusting a metering pump, the uniformly stirred materials A and B were delivered to a mixing head according to a set ratio and were quickly mixed and coated on the formed intermediate layer with a coating and scraping thickness of 0.25 mm to prepare the bonding layer.

Next, the bonding layer was baked for 1.2 min at 85° C., and the Peite flame-retardant recycled leather base cloth was laminated, laminated to 1.1 mm, subjected to high-temperature curing, peeled off and divided into rolls after being cured for 7 min at a temperature of 110° C. to prepare a polyurethane synthetic leather semi-finished product.

Finally, on the surface of the polyurethane synthetic leather semi-finished product, under the condition of 105° C. and at a speed of 20 m/min, the antifouling layer slurry which was a mixture of the water-based antifouling surface agent SF-6110 and modified polycarbodiimide XR-5580 was roll-coated by a 300-mesh surface roller. In this way, a soft solvent-free flame-retardant polyurethane synthetic leather exhibiting daily life antifouling properties and good durability, being soft to touch and strongly skin-friendly, and having a very superior flame-retardant performance was prepared.

Example 2

First, 15 g of n-propyltrimethoxysilane, 5 g of water, and 70 g of absolute ethanol were added into a three-neck flask, and the three-neck flask was sealed and placed in a constant temperature water bath at 25° C. for hydrolysis for 20 min. 2 kg of the mixture (the mass ratio of aluminum hydroxide, boron nitride, and zinc oxide was 4:2:4) was added into a high-speed mixing mixer, the speed was set to 700 r/min, and the drying temperature was set to 120° C. The n-propyltrimethoxysilane hydrolysate was added to the high-speed mixer in three batches, with an interval of 5 min between each batch. The first batch is 40% of the mass of the hydrolysate, the second batch is 40% of the mass of the hydrolysate, and the third batch is 20% of the mass of the hydrolysate. After the addition was completed, stirring was performed at a high speed for 20 min under a condition of 1,200 r/min, and discharging and cooling were performed to obtain the modified filler.

0.6 parts of the abrasion-resistant additive 3238, 0.3 parts of LT-7110, 0.2 parts of the antioxidant 1222, 0.3 parts of UV-2337, 0.2 parts of the hindered amine stabilizer 791, 1.2 parts of FRA-9555, 50 parts of ST-8630, and 70 parts of NE-8875-30MF were all dissolved in 65 parts of DMC. 10 parts of pigment paste were added, fully-stirred, and evenly-mixed, evacuating was performed, the slurry was then evenly-coated and scrapped on the front surface of a piece of release paper to act as the surface layer, and the coating and scraping thickness of the surface layer slurry layer was 0.06 mm.

0.3 parts of the abrasion-resistant additive 3238, 1.0 part of PTFE, 0.2 parts of LT-7110, 0.4 parts of the antioxidant 1081, 0.2 parts of UV-5411, 0.2 parts of the hindered amine stabilizer 2030, 4 parts of SPB-100, and 120 parts of NES-9015-22 then were all dissolved in 60 parts of DEF. 10 parts of pigment paste were added, fully-stirred, and evenly-mixed, evacuating was performed, the slurry was then evenly-coated and scrapped on surface layer to prepare the intermediate layer, and the coating and scraping thickness of the intermediate layer slurry layer was 0.15 mm. The surface layer and the intermediate layer were air-dried at 110° C. for 1.5 min.

Next, 46 parts of isocyanate were added to a storage tank, and 110 parts of polyhydric alcohol, 0.02 parts of HI-0199, 15 parts of modified filler, 5 parts of flame retardant, and 3.5 parts of glycerol triacetate were added to another storage tank. By adjusting a metering pump, the uniformly stirred materials A and B were delivered to a mixing head according to a set ratio and were quickly mixed and casted on the formed surface layer and the intermediate layer slurry layer with a coating and scraping thickness of 0.3 mm to prepare the bonding layer.

Next, the bonding layer was baked for 1 min at 90° C., and the Peite flame-retardant recycled leather base cloth was laminated, laminated to 1.15 mm, subjected to high-temperature curing, peeled off and divided into rolls after being cured for 6 min at a temperature of 120° C. to prepare a polyurethane synthetic leather semi-finished product.

Finally, on the surface of the polyurethane synthetic leather semi-finished product, under the condition of 110° C. and at a speed of 22 m/min, the antifouling layer slurry which was a mixture of the water-based antifouling surface agent SF-6110 and modified polycarbodiimide XR-5580 was roll-coated by a 300-mesh surface roller. In this way, a soft solvent-free flame-retardant polyurethane synthetic leather exhibiting daily life antifouling properties and good durability, being soft to touch and strongly skin-friendly, and having a very superior flame-retardant performance was prepared.

Example 3

First, 15 g of n-propyltrimethoxysilane, 5 g of water, and 60 g of absolute ethanol were added into a three-neck flask, and the three-neck flask was sealed and placed in a constant temperature water bath at 28° C. for hydrolysis for 15 min. 1.5 kg of the mixture (the mass ratio of aluminum hydroxide, boron nitride, and zinc oxide was 6:2:2) was added into a high-speed mixing mixer, the speed was set to 600 r/min, and the drying temperature was set to 115° C. The n-propyltrimethoxysilane hydrolysate was added to the high-speed mixer in three batches, with an interval of 6 min between each batch. The first batch is 50% of the mass of the hydrolysate, the second batch is 40% of the mass of the hydrolysate, and the third batch is 10% of the mass of the hydrolysate. After the addition was completed, stirring was performed at a high speed for 15 min under a condition of 1,400 r/min, and discharging and cooling were performed to obtain the modified filler.

0.8 parts of the abrasion-resistant additive 3238, 0.3 parts of LT-7110, 0.4 parts of the antioxidant 1222, 0.4 parts of UV-1425, 0.3 parts of the hindered amine stabilizer 2040, 1.5 parts of FRA-9555, 55 parts of ST-8630, and 90 parts of NE-8875-30MF were all dissolved in 85 parts of DMC. 15 parts of pigment paste were added, fully-stirred, and evenly-mixed, evacuating was performed, the slurry was then evenly-coated and scrapped on the front surface of a piece of release paper to act as the surface layer, and the coating and scraping thickness of the surface layer slurry layer was 0.08 mm.

0.5 parts of the abrasion-resistant additive 3238, 1.5 parts PTFE, 0.3 parts of LT-7110, 0.5 parts of the antioxidant 1081, 0.4 parts of UV-5411, 0.5 parts of the hindered amine stabilizer 2030, 6 parts of SPB-100, and 140 parts of NES-9015-22 then were all dissolved in 65 parts of DEF. 13 parts of pigment paste were added, fully-stirred, and evenly-mixed, evacuating was performed, the slurry was then evenly-coated and scrapped on surface layer to prepare the intermediate layer, and the coating and scraping thickness of the intermediate layer slurry layer was 0.18 mm. The surface layer and the intermediate layer were air-dried at 115° C. for 1 min.

Next, 47.5 parts of A1-2010B were added to a storage tank, and 115 parts of A1-2010A, 0.03 parts of HI-0199, 25 parts of modified filler, 10 parts of flame retardant, and 4 parts of glycerol triacetate were added to another storage tank. By adjusting a metering pump, the uniformly stirred materials A and B were delivered to a mixing head according to a set ratio and were quickly mixed and casted on the formed surface layer and the intermediate layer slurry layer with a coating and scraping thickness of 0.4 mm to prepare the bonding layer.

Next, the bonding layer was baked for 1 min at 95° C., and the Peite flame-retardant recycled leather base cloth was laminated, laminated to 1.15 mm, subjected to high-temperature curing, peeled off and divided into rolls after being cured for 7 min at a temperature of 110° C. to prepare a polyurethane synthetic leather semi-finished product.

Finally, on the surface of the polyurethane synthetic leather semi-finished product, under the condition of 120° C. and at a speed of 25 m/min, the antifouling layer slurry which was a mixture of the water-based antifouling surface agent SF-6110 and modified polycarbodiimide XR-5580 was roll-coated by a 300-mesh surface roller. In this way, a soft solvent-free flame-retardant polyurethane synthetic leather exhibiting daily life antifouling properties and good durability, being soft to touch and strongly skin-friendly, and having a very superior flame-retardant performance was prepared.

Example 4

First, 12 g of n-propyltrimethoxysilane, 4.5 g of water, and 55 g of absolute ethanol were added into a three-neck flask, and the three-neck flask was sealed and placed in a constant temperature water bath at 30° C. for hydrolysis for 18 min. 1.5 kg of the mixture (the mass ratio of aluminum hydroxide, boron nitride, and zinc oxide was 6:1:3) was added into a high-speed mixing mixer, the speed was set to 650 r/min, and the drying temperature was set to 120° C. The n-propyltrimethoxysilane hydrolysate was added to the high-speed mixer in three batches, with an interval of 5.5 min between each batch. The first batch is 30% of the mass of the hydrolysate, the second batch is 40% of the mass of the hydrolysate, and the third batch is 30% of the mass of the hydrolysate. After the addition was completed, stirring was performed at a high speed for 17 min under a condition of 2,000 r/min, and discharging and cooling were performed to obtain the modified filler.

1 part of the abrasion-resistant additive 3238, 0.4 parts of LT-7110, 0.2 parts of the antioxidant 1222, 0.6 parts of UV-1425, 0.3 parts of the hindered amine stabilizer 2040, 1.8 parts of FRA-9555, 60 parts of ST-8630, and 95 parts of NE-8875-30MF were all dissolved in 85 parts of DMC. 15 parts of pigment paste were added, fully-stirred, and evenly-mixed, evacuating was performed, the slurry was then evenly-coated and scrapped on the front surface of a piece of release paper to act as the surface layer, and the coating and scraping thickness of the surface layer slurry layer was 0.08 mm.

1.0 part of the abrasion-resistant additive 3238, 1.0 part of PTFE, 0.5 parts of LT-7110, 0.4 parts of the antioxidant 1081, 0.4 parts of UV-5411, 0.5 parts of the hindered amine stabilizer 2030, 6 parts of SPB-100, and 150 parts of NES-9015-22 then were all dissolved in 65 parts of DEF. 13 parts of pigment paste were added, fully-stirred, and evenly-mixed, evacuating was performed, the slurry was then evenly-coated and scrapped on surface layer to prepare the intermediate layer, and the coating and scraping thickness of the intermediate layer slurry layer was 0.18 mm. The surface layer and the intermediate layer were air-dried at 115° C. for 1 min.

Next, 46.5 parts of A1-2010B were added to a storage tank, and 115 parts of A1-2010A, 0.03 parts of HI-0199, 25 parts of modified filler, 10 parts of flame retardant, and 4 parts of glycerol triacetate were added to another storage tank. By adjusting a metering pump, the uniformly stirred materials A and B were delivered to a mixing head according to a set ratio and were quickly mixed and casted on the formed surface layer and the intermediate layer slurry layer with a coating and scraping thickness of 0.4 mm to prepare the bonding layer.

Next, the bonding layer was baked for 1 min at 95° C., and the Peite flame-retardant recycled leather base cloth was laminated, laminated to 1.15 mm, subjected to high-temperature curing, peeled off and divided into rolls after being cured for 7 min at a temperature of 110° C. to prepare a polyurethane synthetic leather semi-finished product.

Finally, on the surface of the polyurethane synthetic leather semi-finished product, under the condition of 120° C. and at a speed of 25 m/min, the antifouling layer slurry which was a mixture of the water-based antifouling surface agent SF-6110 and modified polycarbodiimide XR-5580 was roll-coated by a 300-mesh surface roller. In this way, a soft solvent-free flame-retardant polyurethane synthetic leather exhibiting daily life antifouling properties and good durability, being soft to touch and strongly skin-friendly, and having a very superior flame-retardant performance was prepared.

Comparative Example 1

First, 12 g of n-propyltrimethoxysilane, 4 g of water, and 50 g of absolute ethanol were added into a three-neck flask, and the three-neck flask was sealed and placed in a constant temperature water bath at 30° C. for hydrolysis for 30 min. 1.3 kg of the mixture (the mass ratio of aluminum hydroxide, boron nitride, and zinc oxide was 6:1:3) was added into a high-speed mixing mixer, the speed was set to 750 r/min, and the drying temperature was set to 125° C. The n-propyltrimethoxysilane hydrolysate was added to the high-speed mixer in three batches, with an interval of 8 min between each batch. The first batch is 45% of the mass of the hydrolysate, the second batch is 35% of the mass of the hydrolysate, and the third batch is 20% of the mass of the hydrolysate. After the addition was completed, stirring was performed at a high speed for 14 min under a condition of 1,800 r/min, and discharging and cooling were performed to obtain the modified filler.

1 part of the abrasion-resistant additive 3238, 0.4 parts of LT-7110, 0.2 parts of the antioxidant 1222, 0.6 parts of UV-1425, 0.3 parts of the hindered amine stabilizer 2040, 1.5 parts of FRA-9555, 55 parts of ST-8630, and 90 parts of NE-8875-30MF were all dissolved in 85 parts of DMC. 15 parts of pigment paste were added, fully-stirred, and evenly-mixed, evacuating was performed, the slurry was then evenly-coated and scrapped on the front surface of a piece of release paper to act as the surface layer, and the coating and scraping thickness of the surface layer slurry layer was 0.08 mm.

1.0 part of the abrasion-resistant additive 3238, 1.0 part of PTFE, 0.5 parts of LT-7110, 0.4 parts of the antioxidant 1081, 0.4 parts of UV-5411, 0.5 parts of the hindered amine stabilizer 2030, 6 parts of SPB-100, and 130 parts of NES-9015-22 then were all dissolved in 50 parts of DEF. 13 parts of pigment paste were added, fully-stirred, and evenly-mixed, evacuating was performed, the slurry was then evenly-coated and scrapped on surface layer to prepare the intermediate layer, and the coating and scraping thickness of the intermediate layer slurry layer was 0.18 mm. The surface layer and the intermediate layer were air-dried at 115° C. for 1 min.

Next, 58 parts of BASF material B of isocyanate were added to a storage tank, and 100 parts of BASF material A of polyhydric alcohol, 0.03 parts of BASF material 93540, 0.04 parts of BASF material 93600, 15 parts of modified filler, 10 parts of flame retardant, and 4 parts of glycerol triacetate were added to another storage tank. By adjusting a metering pump, the uniformly stirred materials A and B were delivered to a mixing head according to a set ratio and were quickly mixed and casted on the formed surface layer and the intermediate layer slurry layer with a coating and scraping thickness of 0.4 mm to prepare the bonding layer.

Next, the bonding layer was baked for 1 min at 95° C., and the Peite flame-retardant recycled leather base cloth was laminated, laminated to 1.15 mm, subjected to high-temperature curing, peeled off and divided into rolls after being cured for 7 min at a temperature of 110° C. to prepare a polyurethane synthetic leather semi-finished product.

Finally, on the surface of the polyurethane synthetic leather semi-finished product, under the condition of 115° C. and at a speed of 20 m/min, the antifouling layer slurry which was a mixture of the water-based antifouling surface agent SF-6110 and modified polycarbodiimide XR-5580 was roll-coated by a 300-mesh surface roller. In this way, a soft solvent-free flame-retardant polyurethane synthetic leather exhibiting daily life antifouling properties and good durability, being soft to touch and strongly skin-friendly, and having a very superior flame-retardant performance was prepared.

Comparative Example 2

First, 15 g of n-propyltrimethoxysilane, 5 g of water, and 55 g of absolute ethanol were added into a three-neck flask, and the three-neck flask was sealed and placed in a constant temperature water bath at 30° C. for hydrolysis for 25 min. 1 kg of the mixture (the mass ratio of aluminum hydroxide, boron nitride, and zinc oxide was 6:1:3) was added into a high-speed mixing mixer, the speed was set to 800 r/min, and the drying temperature was set to 115° C. The n-propyltrimethoxysilane hydrolysate was added to the high-speed mixer in three batches, with an interval of 7 min between each batch. The first batch is 35% of the mass of the hydrolysate, the second batch is 35% of the mass of the hydrolysate, and the third batch is 30% of the mass of the hydrolysate. After the addition was completed, stirring was performed at a high speed for 14 min under a condition of 1,600 r/min, and discharging and cooling were performed to obtain the modified filler.

1 part of the abrasion-resistant additive 3238, 0.4 parts of LT-7110, 0.2 parts of the antioxidant 1222, 0.6 parts of UV-1425, 0.3 parts of the hindered amine stabilizer 2040, 1.6 parts of FRA-9555, 40 parts of ST-8630, and 105 parts of NE-8875-30MF were all dissolved in 85 parts of DMC. 15 parts of pigment paste were added, fully-stirred, and evenly-mixed, evacuating was performed, the slurry was then evenly-coated and scrapped on the front surface of a piece of release paper to act as the surface layer, and the coating and scraping thickness of the surface layer slurry layer was 0.08 mm.

1.0 part of the abrasion-resistant additive 3238, 1.0 part of PTFE, 0.5 parts of LT-7110, 0.4 parts of the antioxidant 1081, 0.4 parts of UV-5411, 0.5 parts of the hindered amine stabilizer 2030, 6 parts of SPB-100, and 150 parts of NES-9015-22 then were all dissolved in 70 parts of DEF. 13 parts of pigment paste were added, fully-stirred, and evenly-mixed, evacuating was performed, the slurry was then evenly-coated and scrapped on surface layer to prepare the intermediate layer, and the coating and scraping thickness of the intermediate layer slurry layer was 0.18 mm. The surface layer and the intermediate layer were air-dried at 115° C. for 1 min.

Next, 52 parts of BASF material B of isocyanate were added to a storage tank, and 100 parts of BASF material A of polyhydric alcohol, 0.03 parts of BASF material 93540, 0.04 parts of BASF material 93600, 12 parts of modified filler, 5 parts of flame retardant, and 4 parts of glycerol triacetate were added to another storage tank. By adjusting a metering pump, the uniformly stirred materials A and B were delivered to a mixing head according to a set ratio and were quickly mixed and casted on the formed surface layer and the intermediate layer slurry layer with a coating and scraping thickness of 0.4 mm to prepare the bonding layer.

Next, the bonding layer was baked for 1 min at 95° C., and the Peite flame-retardant recycled leather base cloth was laminated, laminated to 1.1 mm, subjected to high-temperature curing, peeled off and divided into rolls after being cured for 7 min at a temperature of 110° C. to prepare a polyurethane synthetic leather semi-finished product.

Finally, on the surface of the polyurethane synthetic leather semi-finished product, under the condition of 110° C. and at a speed of 20 m/min, the antifouling layer slurry which was a mixture of the water-based antifouling surface agent SF-6110 and modified polycarbodiimide XR-5580 was roll-coated by a 300-mesh surface roller. In this way, a soft solvent-free flame-retardant polyurethane synthetic leather exhibiting daily life antifouling properties and good durability, being soft to touch and strongly skin-friendly, and having a very superior flame-retardant performance was prepared.

In the invention, the modified filler is prepared by a dry modification process, exhibits an activation degree greater than 97%, and provides a suspending effect in the component A of the bonding layer.

Comparative Example 3

Commercially available polyurethane synthetic leather products on the market were chosen. Polyester and polyether polyurethane resin were adopted as the surface layer or the surface layer and the intermediate layer, and BASF CC6945-100C series, Asahikawa Chemical XCS series, or Huafeng JF-NS series were adopted as the solvent-free bonding layer, which were prepared by laminating polyester and polyester-cotton base cloth with a two-knife or three-knife drying process.

The properties of the polyurethane synthetic leather prepared in the foregoing Examples 1-6 and the Comparative Examples were tested respectively as shown in the following table. The softness is tested according to the 20% flat loop method of determination of softness of rubber or plastics coated fabrics of HGT3053.

TABLE 1

| Synthetic Leather | Abrasion Resistance (Valspar Testing and Martindale Testing) | Sedimentation of Filler in Component A of Bonding Layer | Softness | Flame Retardant Properties (FMVSS 302, BS5852:2006, and I/5) | Hydrolysis Resistance (Under Condition of 70° C. × 95% RH in Constant Temperature and Humidity Box) |
|---|---|---|---|---|---|
| Example 1 | 1.2 million times without breaking, 300,000 times without breaking | good suspending effect | 7.3 mm | satisfying needs | no chalking and no cracking of leather surface for 10 weeks |
| Example 2 | 1.4 million times without breaking, 400,000 times without breaking | good suspending effect | 7.0 mm | satisfying needs | no chalking and no cracking of leather surface for 11 weeks |
| Example 3 | 1.52 million times without breaking, 500,000 times without breaking | good suspending effect | 7.2 mm | satisfying needs | no chalking and no cracking of leather surface for 12 weeks |
| Example 4 | 1.5 million times without breaking, 500,000 times without breaking | good suspending effect | 7.5 mm | satisfying needs | no chalking and no cracking of leather surface for 10 weeks |
| Comparative Example 1 | 600,000 times without breaking, 200,000 times without breaking | good suspending effect | 4.8 mm | satisfying needs | no chalking and no cracking of leather surface for 7 weeks |
| Comparative Example 2 | 150,000 times without breaking, 100,000 times without breaking | good suspending effect | 6.7 mm | satisfying needs | solvent-free bonding layer becoming sticky, leather surface damaged after 3-4 weeks |
| Comparative Example 3 | 100,000-200,000 times without breaking, 50,000-100,000 times without breaking | / | 2.8-5.2 mm | satisfying flame No. 302 or 0/1 only | no chalking and no cracking of leather surface for 3-6 weeks |

From the above table, it can be seen that the polyurethane synthetic leather prepared by Examples 1-4 provided by the invention may exhibit antifouling properties (antifouling performance≥level 4) and good durability, is soft to touch (softness≥7.0 mm) and strongly skin-friendly, and has a very superior abrasion-resistant (satisfying Valspar testing and Martindale testing) and flame-retardant performance (satisfying British Standard BS5852:2006, No. 5 flame detection requirements, American Standard FMVSS 302). The production process is simple, efficient, and environmentally friendly and may satisfy market demands. The performance more favorable than the existing solvent-free polyurethane synthetic leather products on the market in Comparative Example 3.

Since the BASF material A and B system is adopted for the bonding layer in Comparative Examples 1-2, the overall physical properties of the produced synthetic leather are lower than those provided in Examples 1-4 of the invention. In Comparative Example 1, according to the ratio of formula A and B provided by BASF, the finished leather feels hard and has a strong plastic feel.

In Comparative Example 2, the R value in the BASF system is lowered, the hand feeling became soft, but the durability is significantly reduced (solvent-free bonding layer becoming sticky, leather surface damaged after 3-4 weeks).

For a person having ordinary skill in the art, it is obvious that the invention is not limited to the details of the foregoing exemplary embodiments, and the invention may be implemented in other specific forms without departing from the spirit or basic features of the invention.

Industrial Applicability

The polyurethane synthetic leather prepared by the present invention has daily life antifouling properties, a good durability, is soft to touch, is strongly skin-friendly, and has a very superior flame-retardant performance, and also has excellent antifouling, scratch resistance and flexure resistance properties; the production process is simple, efficient and environmentally friendly and same can satisfy market demands, and the polyurethane synthetic leather therefore exhibits industrial applicability.

What is claimed is:

1. A soft solvent-free flame-retardant polyurethane synthetic leather comprising an antifouling layer, a surface layer, an intermediate layer, a bonding layer, and a base cloth in sequence from top to bottom, wherein the bonding layer is prepared from a component A and an isocyanate, and a molar ratio of —NCO in the isocyanate to —OH in the component A is 0.85-0.93,
wherein the component A is composed of following raw materials in parts by weight: 105-115 parts of a polyhydric alcohol, 0.03-0.08 parts of an inhibition-type catalyst, 2-10 parts of a flame retardant, 5-25 parts of a filler, and 3-6 parts of a viscosity modifier.

2. The soft solvent-free flame-retardant polyurethane synthetic leather according to claim 1, wherein the inhibition-type catalyst is an environmentally friendly organic zirconium catalyst,
the flame retardant is at least two of GRPHOS 8815-10 and GRPHOS 8815-57 of Gulec and EXOLIT AP 462 and EXOLIT RP-652 of Clariant,
the filler refers to a modified filler obtained by dry modification of a mixture of aluminum hydroxide, boron nitride, and zinc oxide, wherein a mass ratio of the aluminum hydroxide, boron nitride, and zinc oxide is (40-60):(10-20):(20-40), and
the viscosity modifier is glycerol triacetate.

3. The soft solvent-free flame-retardant polyurethane synthetic leather according to claim 2, wherein a preparation method for the modified filler comprises:
step a, adding 10-15 g silane coupling agent, 3.5-5 g water, and 50-80 g absolute ethanol into a container and sealing and placing the container in a constant temperature water bath at 25-35° C. for hydrolysis for 10-30 min to obtain a hydrolysate;
step b, mixing the aluminum hydroxide, boron nitride, and zinc oxide into a mixture at a mass ratio of (40-60):(10-20):(20-40) and adding 1-2 kg of the mixture to a high-speed mixing mixer, wherein a speed of the high-speed mixing mixer is 500-800 r/min, and a drying temperature is set to 110-125° C.;
step c, adding the hydrolysate prepared in the step a into the high-speed mixing mixer provided in the step b in three batches, wherein an interval of adding each batch is 5-8 min, an amount of a first batch added is 30-50% of a mass of the hydrolysate, an amount of a second batch added is 20-40% of the mass of the hydrolysate, and a third batch is an remaining amount; and
step d, stirring at a high speed for 10-20 min under a condition of 1,200-2,000 r/min after the addition is completed and performing discharging and cooling to obtain the modified filler.

4. The soft solvent-free flame-retardant polyurethane synthetic leather according to claim 1, wherein the antifouling layer is prepared by following components in parts by weight: 100 parts of a water-based antifouling surface agent, and 0.5-2 parts of a hydrolysis resistance additive, wherein the surface layer is prepared by following components in parts by weight: 0-160 parts of a polycarbonate polyurethane resin, 55-85 parts of an environmentally friendly solvent, 0.4-1.0 parts of an abrasion-resistant additive, 1-2 parts of a liquid flame retardant, 0.1-0.4 parts of a wetting agent, 0.3-1.2 parts of a stabilizer, and 3-15 parts of a pigment paste.

5. The soft solvent-free flame-retardant polyurethane synthetic leather according to claim 4, wherein the water-based antifouling surface agent is an aliphatic water-based polyurethane, and the hydrolysis resistance additive is a modified polycarbodiimide,
wherein the polycarbonate polyurethane resin is formed by mixing NE-8875-30MF and ST-8630 at a weight ratio of 1.5:(1-1.5),
wherein the liquid flame retardant is a halogen-free phosphate flame retardant.

6. The soft solvent-free flame-retardant polyurethane synthetic leather according to claim 1, wherein the intermediate layer is prepared by following components in parts by weight: 90-160 parts of a polyether polycarbonate polyurethane resin, 50-70 parts of an environmentally friendly solvent, 0.5-2 parts of an abrasion-resistant additive, 1-6 parts of a soluble flame retardant, 0.1-0.4 parts of a wetting agent, 0.5-1.5 parts of a stabilizer, and 3-15 parts of a pigment paste.

7. The soft solvent-free flame-retardant polyurethane synthetic leather according to claim 6, wherein the polyether polycarbonate polyurethane resin is NES-9015-22, and the soluble flame retardant is a phosphazene flame retardant.

8. The soft solvent-free flame-retardant polyurethane synthetic leather according to claim 1, wherein the base cloth is a Peite flame-retardant recycled leather base cloth and is formed by a leather powder and a cotton woven cloth in a weight ratio of (55-65):(35-45), a thickness thereof is 1.3±0.1 mm, and a weight thereof is 700±20 g/cm².

9. A preparation method for the soft solvent-free flame-retardant polyurethane synthetic leather according to claim 1, comprising:
- step 1, evenly stirring and mixing a surface layer slurry, performing evacuating, evenly coating and scraping the surface layer slurry on a front surface of a piece of release paper to act as the surface layer, evenly stirring and mixing an intermediate layer slurry, performing evacuating, and evenly coating and scraping the intermediate layer slurry on the surface layer to prepare the intermediate layer;
- step 2, stirring and mixing the component A and the isocyanate to form a bonding layer slurry, coating the bonding layer slurry on the intermediate layer, and performing heating and drying to obtain the bonding layer;
- step 3, laminating the base cloth on the bonding layer and performing drying, curing, peeling off, and dividing into rolls to obtain a polyurethane synthetic leather semi-finished product; and
- step 4, roll-coating an antifouling layer slurry on a leather surface of the synthetic leather semi-finished product prepared in the step 3 through a surface roller and performing drying to obtain the synthetic leather semi-finished product.

10. The preparation method according to claim 9, wherein a coating thickness of the surface layer slurry is 0.05-0.08 mm, a coating and scraping thickness of the intermediate layer slurry is 0.12-0.18 mm, and the surface layer and the intermediate layer are air-dried for 1-1.5 min at 110-115° C. in the step 1,
a mixing and stirring speed of the bonding layer slurry is 3,000-3,500 r/min, a heating and drying temperature is 80-95° C., and a coating thickness of the bonding layer is 0.25-0.4 mm in the step 2,
a drying temperature is 110-130° C., a curing time is 5-7 min, and a lamination gap when laminating the base cloth is 78-85% of a thickness of the base cloth in the step 3, and
a drying temperature is 140-150° C., the surface roller is 300 mesh, and a speed is 20-25 m/min in the step 4.

11. A preparation method for the soft solvent-free flame-retardant polyurethane synthetic leather according to claim 2, comprising:
- step 1, evenly stirring and mixing a surface layer slurry, performing evacuating, evenly coating and scraping the surface layer slurry on a front surface of a piece of release paper to act as the surface layer, evenly stirring and mixing an intermediate layer slurry, performing evacuating, and evenly coating and scraping the intermediate layer slurry on the surface layer to prepare the intermediate layer;
- step 2, stirring and mixing the component A and the isocyanate to form a bonding layer slurry, coating the bonding layer slurry on the intermediate layer, and performing heating and drying to obtain the bonding layer;
- step 3, laminating the base cloth on the bonding layer and performing drying, curing, peeling off, and dividing into rolls to obtain a polyurethane synthetic leather semi-finished product; and
- step 4, roll-coating an antifouling layer slurry on a leather surface of the synthetic leather semi-finished product prepared in the step 3 through a surface roller and performing drying to obtain the synthetic leather semi-finished product.

12. A preparation method for the soft solvent-free flame-retardant polyurethane synthetic leather according to claim 3, comprising:
- step 1, evenly stirring and mixing a surface layer slurry, performing evacuating, evenly coating and scraping the surface layer slurry on a front surface of a piece of release paper to act as the surface layer, evenly stirring and mixing an intermediate layer slurry, performing evacuating, and evenly coating and scraping the intermediate layer slurry on the surface layer to prepare the intermediate layer;
- step 2, stirring and mixing the component A and the isocyanate to form a bonding layer slurry, coating the bonding layer slurry on the intermediate layer, and performing heating and drying to obtain the bonding layer;
- step 3, laminating the base cloth on the bonding layer and performing drying, curing, peeling off, and dividing into rolls to obtain a polyurethane synthetic leather semi-finished product; and
- step 4, roll-coating an antifouling layer slurry on a leather surface of the synthetic leather semi-finished product prepared in the step 3 through a surface roller and performing drying to obtain the synthetic leather semi-finished product.

13. A preparation method for the soft solvent-free flame-retardant polyurethane synthetic leather according to claim 4, comprising:
- step 1, evenly stirring and mixing a surface layer slurry, performing evacuating, evenly coating and scraping the surface layer slurry on a front surface of a piece of release paper to act as the surface layer, evenly stirring and mixing an intermediate layer slurry, performing evacuating, and evenly coating and scraping the intermediate layer slurry on the surface layer to prepare the intermediate layer;
- step 2, stirring and mixing the component A and the isocyanate to form a bonding layer slurry, coating the bonding layer slurry on the intermediate layer, and performing heating and drying to obtain the bonding layer;
- step 3, laminating the base cloth on the bonding layer and performing drying, curing, peeling off, and dividing into rolls to obtain a polyurethane synthetic leather semi-finished product; and
- step 4, roll-coating an antifouling layer slurry on a leather surface of the synthetic leather semi-finished product prepared in the step 3 through a surface roller and performing drying to obtain the synthetic leather semi-finished product.

14. A preparation method for the soft solvent-free flame-retardant polyurethane synthetic leather according to claim 5, comprising:
- step 1, evenly stirring and mixing a surface layer slurry, performing evacuating, evenly coating and scraping the surface layer slurry on a front surface of a piece of release paper to act as the surface layer, evenly stirring and mixing an intermediate layer slurry, performing evacuating, and evenly coating and scraping the intermediate layer slurry on the surface layer to prepare the intermediate layer;
- step 2, stirring and mixing the component A and the isocyanate to form a bonding layer slurry, coating the bonding layer slurry on the intermediate layer, and performing heating and drying to obtain the bonding layer;

step 3, laminating the base cloth on the bonding layer and performing drying, curing, peeling off, and dividing into rolls to obtain a polyurethane synthetic leather semi-finished product; and step 4, roll-coating an antifouling layer slurry on a leather surface of the synthetic leather semi-finished product prepared in the step 3 through a surface roller and performing drying to obtain the synthetic leather semi-finished product.

15. A preparation method for the soft solvent-free flame-retardant polyurethane synthetic leather according to claim 6, comprising:

step 1, evenly stirring and mixing a surface layer slurry, performing evacuating, evenly coating and scraping the surface layer slurry on a front surface of a piece of release paper to act as the surface layer, evenly stirring and mixing an intermediate layer slurry, performing evacuating, and evenly coating and scraping the intermediate layer slurry on the surface layer to prepare the intermediate layer;

step 2, stirring and mixing the component A and the isocyanate to form a bonding layer slurry, coating the bonding layer slurry on the intermediate layer, and performing heating and drying to obtain the bonding layer;

step 3, laminating the base cloth on the bonding layer and performing drying, curing, peeling off, and dividing into rolls to obtain a polyurethane synthetic leather semi-finished product; and step 4, roll-coating an antifouling layer slurry on a leather surface of the synthetic leather semi-finished product prepared in the step 3 through a surface roller and performing drying to obtain the synthetic leather semi-finished product.

16. A preparation method for the soft solvent-free flame-retardant polyurethane synthetic leather according to claim 7, comprising:

step 1, evenly stirring and mixing a surface layer slurry, performing evacuating, evenly coating and scraping the surface layer slurry on a front surface of a piece of release paper to act as the surface layer, evenly stirring and mixing an intermediate layer slurry, performing evacuating, and evenly coating and scraping the intermediate layer slurry on the surface layer to prepare the intermediate layer;

step 2, stirring and mixing the component A and the isocyanate to form a bonding layer slurry, coating the bonding layer slurry on the intermediate layer, and performing heating and drying to obtain the bonding layer;

step 3, laminating the base cloth on the bonding layer and performing drying, curing, peeling off, and dividing into rolls to obtain a polyurethane synthetic leather semi-finished product; and step 4, roll-coating an antifouling layer slurry on a leather surface of the synthetic leather semi-finished product prepared in the step 3 through a surface roller and performing drying to obtain the synthetic leather semi-finished product.

17. A preparation method for the soft solvent-free flame-retardant polyurethane synthetic leather according to claim 8, comprising:

step 1, evenly stirring and mixing a surface layer slurry, performing evacuating, evenly coating and scraping the surface layer slurry on a front surface of a piece of release paper to act as the surface layer, evenly stirring and mixing an intermediate layer slurry, performing evacuating, and evenly coating and scraping the intermediate layer slurry on the surface layer to prepare the intermediate layer;

step 2, stirring and mixing the component A and the isocyanate to form a bonding layer slurry, coating the bonding layer slurry on the intermediate layer, and performing heating and drying to obtain the bonding layer;

step 3, laminating the base cloth on the bonding layer and performing drying, curing, peeling off, and dividing into rolls to obtain a polyurethane synthetic leather semi-finished product; and step 4, roll-coating an antifouling layer slurry on a leather surface of the synthetic leather semi-finished product prepared in the step 3 through a surface roller and performing drying to obtain the synthetic leather semi-finished product.

* * * * *